United States Patent [19]

Sakatani et al.

[11] Patent Number: 4,798,476
[45] Date of Patent: Jan. 17, 1989

[54] DYNAMIC PRESSURE TYPE FLUID BEARING DEVICE

[75] Inventors: Ikunori Sakatani, Fujisawa; Katsuhiko Tanaka, Yamato; Masaru Tamaki, Hiratsuka, all of Japan

[73] Assignee: Nippon Seiko Kabushiki Kaisha, Tokyo, Japan

[21] Appl. No.: 724,485

[22] Filed: Apr. 18, 1985

Related U.S. Application Data

[63] Continuation-in-part of Ser. No. 371,460 Apr. 23, 1982, abandoned.

[30] Foreign Application Priority Data

Apr. 27, 1981 [JP] Japan .............................. 56-59790[U]
May 6, 1981 [JP] Japan .............................. 56-64366[U]

[51] Int. Cl.[4] .......................... F16C 17/10; F16C 32/06
[52] U.S. Cl. ........................... 384/108; 384/113; 384/121; 384/245
[58] Field of Search ............... 384/99, 100, 107, 108, 384/112, 113, 114, 115, 121, 123, 245, 397, 368, 371

[56] References Cited

U.S. PATENT DOCUMENTS

| | | | |
|---|---|---|---|
| 1,357,420 | 11/1920 | Prestwich | 384/371 |
| 2,048,708 | 7/1936 | Pfanstiehl | 384/245 |
| 2,722,463 | 11/1955 | Shaw et al. | 384/108 |
| 2,756,115 | 7/1956 | Michel | 384/107 |
| 3,238,000 | 3/1966 | Muijderman et al. | 384/398 |
| 3,399,000 | 8/1968 | Remmers | 384/112 |
| 3,494,674 | 2/1970 | Muijderman et al. | 384/113 |
| 3,497,273 | 2/1970 | Muijderman et al. | 384/113 |
| 3,503,658 | 3/1970 | Remmers | 384/113 |
| 3,718,379 | 2/1973 | Williams et al. | 384/113 |
| 4,090,743 | 5/1978 | Suzuki et al. | 384/113 |
| 4,371,220 | 2/1983 | Brucher | 384/371 |

Primary Examiner—David Werner
Attorney, Agent, or Firm—Wyatt, Gerber, Burke and Badie

[57] ABSTRACT

A dynamic pressure type fluid bearing device in which a housing and a shaft rotatable relative to each other are opposed to each other to provide inner and outer bearing surfaces for radial load. One of these bearing surfaces is formed with a groove for generating dynamic pressure and the housing and the shaft are opposed to each other in a first and a second bearing surface for thrust load. A circulation path for circulating lubricant is formed in at least one of the housing and the shaft and opens in the first and/or second bearing surface.

7 Claims, 5 Drawing Sheets

DYNAMIC PRESSURE TYPE FLUID BEARING DEVICE

BACKGROUND OF THE INVENTION

1. Field of the Invention

This invention relates to improvements in a dynamic pressure type fluid bearing device wherein the load capacity during rotation is maintained constant.

2. Description of the Prior Art

The dynamic pressure type fluid bearing device is a bearing device in which a rotational member is mounted for rotation relative to a fixed member and a force for maintaining the positional relation of the rotational member to the fixed member in a predetermined condition is generated on the basis of the rotation of the rotational member. To maintain the two members in a predetermined positional relation, the dynamic pressure must be made constant. For this purpose, an outwardly communicating passage, namely, a circulation path for lubricant, is formed in a pressure chamber and this circulation path is adapted to be opened by the rotational member floating upwardly. However, in the prior art, there has been a problem in the position whereat the circulation path is formed and therefore, it has been difficult to say that the pressure control is effected reliably. These circumstances will hereinafter be described in greater detail by reference to FIG. 1 of the accompanying drawings.

In FIG. 1, a cylindrical hole 2 formed in a fixed housing 1 has a cylindrical internal bearing surface 3 for radial load and a planar first bearing surface 4 for thrust load while, on the other hand, a shaft 5 rotatably fitted in the cylindrical hole 2 has a cylindrical outer bearing surface 7 for radial load having dynamic pressure generating grooves 6 and a convex conical second bearing surface 8 for thrust load. The housing 1 is provided with a circulation path 12 leading from a pressure chamber 11 defined by the bearing surfaces 4 and 8 for thrust load to the upper surface of the housing 1. This circulation path 12 is formed so as to open near the boundary 13 between the bearing surfaces 7 and 8 when the shaft 5 is stationary.

In this prior art, when the shaft 5 rotates, the lubricant between the bearing surfaces 7 and 3 flows into the pressure chamber 11 due to the pumping action of the grooves 6 and the pressure in the pressure chamber 11 is increased, so that the shaft 5 moves upwardly. By the upward movement of the shaft 5, the portion below the boundary 13 becomes opposed to the circulation path 12 and the lubricant in the pressure chamber 11 flows out to the outer peripheral surface of the shaft 5 through the circulation path 12, whereby the amount the shaft 5 floats upwardly is kept substantially constant.

Now, where such a bearing is used in a flat motor or the like, a rotor fixed to the shaft 5 and a stator fixed to the housing 1 are opposed to each other through an axially minute clearance and therefore, it is desired to minimize the relative displacement of the rotor and the stator. However, it is technically difficult to accurately provide the circulation path 12 near the boundary 13 and therefore, it is very difficult to minimize the amount of float-up of the shaft 5 floats upwardly, namely, the relative displacement of the rotor and the stator.

Also, the suction force acting between the rotor and the stator acts as a thrust load and the magnitude thereof is considerably great. However, when the shaft 5 is stationary, the top of the bearing surface 8 makes point contact with the bearing surface 4 of the housing 1 and therefore, the contact surface pressure becomes so high that an impression will sometimes be created in the bearing surface 4.

SUMMARY OF THE INVENTION

It is a first object of the present invention to eliminate the above-noted inconveniences peculiar to the prior art and to provide a bearing device in which the pressure in the pressure chamber can be controlled to a predetermined level to maintain the amount the shaft floats upwardly constant with reliability and high accuracy, and the amount of axial displacement of the shaft relative to the housing is small.

It is a second object of the present invention to achieve the first object while reducing the manufacturing cost of the entire bearing device.

It is a third object of the present invention to provide a bearing device in which damage of the bearing surfaces of the shaft and/or the housing can be prevented.

According to the present invention, a circulation path is formed in the housing and/or the shaft and opened in the bearing surfaces for thrust load so that the bearing surfaces contact each other in the annular contact portion around the opening when the bearing is stationary. By doing so, the pressure of the lubricant in the pressure chamber is regulated into a substantially constant level by the axial displacement of the shaft relative to the housing and a constant thrust load capacity is obtained while, at the same time, the axial displacement of the shaft relative to the housing becomes small. Also, the surface pressure of the bearing surface for thrust load is reduced and therefore, no impression is left in the bearing surface.

The invention will become more fully apparent from the following detailed description thereof taken in conjunction with the accompanying drawings.

DESCRIPTION OF THE PREFERRED EMBODIMENTS

Embodiments of the present invention will hereinafter be described by reference to the drawings, and first, various embodiments in which improvements have been made on the rotating shaft will successively be described.

Figure 1:
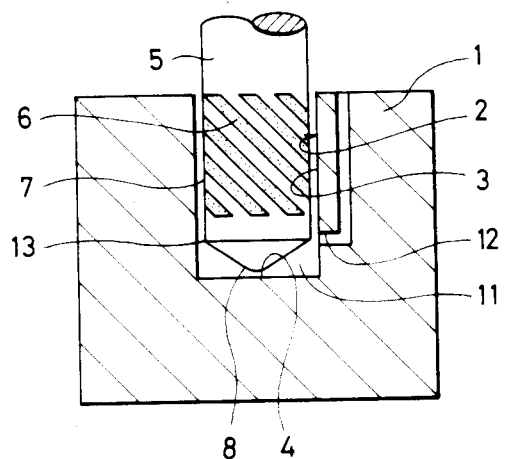
FIG. 1 is a cross-sectional view of the dynamic pressure type fluid bearing device according to the prior art.
Figure 2:
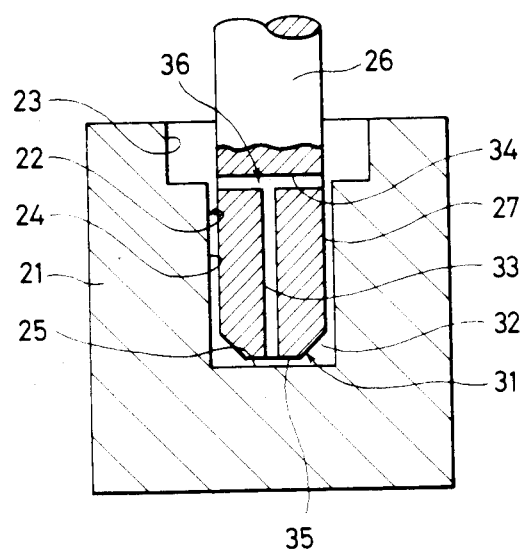
FIG. 2 is a cross-sectional view of the dynamic pressure type fluid bearing device according to an embodiment of the present invention.
Figure 3:
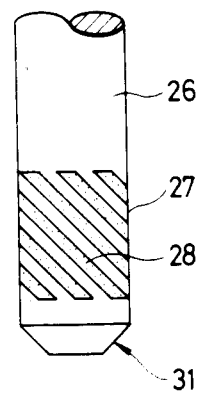
FIG. 3 is a front view of the shaft shown in FIG. 2.

Referring to FIG. 2, a housing 21 comprises a single member and is formed with a cylindrical hole 22. The inner peripheral surface of the cylindrical hole 22 is provided with a cylindrical internal bearing surface 24 for radial load, and the opening portion thereof has a large-diametered bore 23. The bottom surface of the cylindrical hole 22 is provided with a first planar bearing surface 25 for thrust load. A shaft 26 is rotatably fitted in the cylindrical hole 22. The outer peripheral surface of the shaft 26 is provided with a cylindrical outer bearing surface 27 for radial load opposed to and cooperable with the bearing surface 24, and the bearing surface 27 in turn is formed with a spiral grooves 28 for generating dynamic pressure. The end of the shaft 26 (the lower end as viewed in FIG. 3) is provided with a frusto-conical second bearing surface 31 for thrust load opposed to and cooperable with the first bearing surface 25, and a pressure chamber 32 is provided between the two bearing surfaces 25 and 31.

A circulation passage 33 is formed centrally and axially of the shaft 26 and one end thereof opens at the center of the bearing surface 31. The outer end of the circulation passage 33 communicates with the outer peripheral surface of the shaft 26 through a communication passage 34 formed diametrically of the shaft 26. The circulation passage 33 and the communication passage 34 together constitute a circulation path 36. The second bearing surface 31 has around the circulation passage 33 an annular contact portion 35 which directly contacts the first bearing surface 25 when the shaft 26 is stationary, and a lubricant such as oil, grease or air is present in the cylindrical hole 22.

In the dynamic pressure type fluid bearing device having the above-described construction, the first bearing surface 25 and the contact portion 35 of the second bearing surface 31 are in contact with each other when the shaft 26 is stationary, but when the shaft 26 rotates, the lubricant in the large-diametered hole 23 flows into a pressure chamber 32 due to the pumping action of the dynamic pressure generating grooves 28 and the shaft 26 floats upwardly due to the pressure increase in the pressure chamber 32. When the shaft 26 floats upwardly, the circulation passage 33 of the circulation path 36 opens to the pressure chamber 32 and the lubricant in the pressure chamber 32 flows out into the large-diametered hole 23 through the circulation path 36.

In this case, the pressure of the lubricant in the pressure chamber 32 is regulated into a substantially constant level by the variation in amount the shaft 26 floats upwardly. That is, when the pressure in the pressure chamber 32 is high, the shaft 26 floats upwards greatly and the lubricant is positively discharged. (When the pressure is low, the amount the shaft 26 floats upwardly is small and accordingly, the lubricant is not discharged so positively, whereby a predetermined thrust load capacity is obtained and the amount of float-up of the shaft 26 floats upwardly can be minimized. This has become possible by forming a circular bearing surface 31 on the end of the shaft 26, causing the circulation path 36 formed in the central portion of the shaft 26 to open onto the bearing surface 31 and causing the shaft 26 to contact the bearing surface 25 by the annular contact portion 35.

Figure 4:
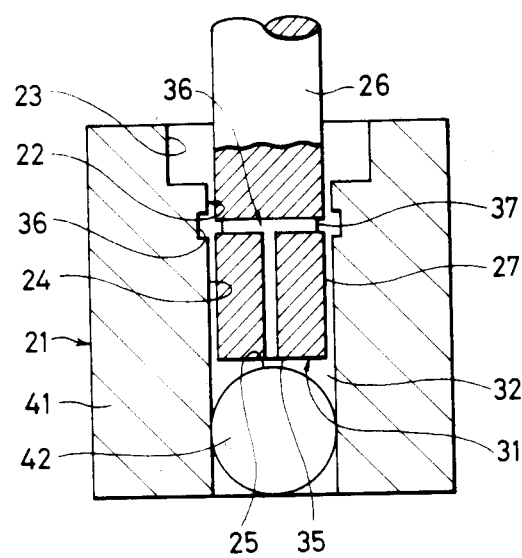
FIGS. 4, 6 and 8 are cross-sectional views of the dynamic pressure type fluid bearing devices according to further embodiments of the present invention.
Figure 5:
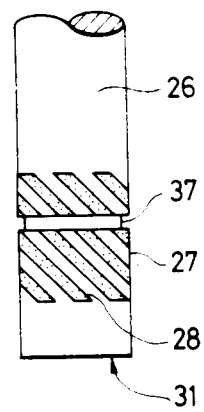
FIG. 5 is a front view of the shaft shown in FIG. 4.

In the embodiment shown in FIGS. 4 and 5, a housing 21 comprises an outer cylinder 41 and a ball 42 fixedly press-fitted in the bottom of the inner peripheral surface of the outer cylinder 41. The inner peripheral surface of the outer cylinder 41 provides an internal bearing surface 24, and an inner peripheral groove 36 is formed in the upper portion of the bearing surface 24. On the other hand, the surface of the ball 42 provides a first bearing surface 25, and a second bearing surface 31 of a shaft 26 is planar. An outer peripheral groove 37 is formed in an outer bearing surface 27 at a position opposed to the inner peripheral groove 36. This outer peripheral groove 37 leads to the bearing surface 27 through a circulation path 36.

Figure 6:
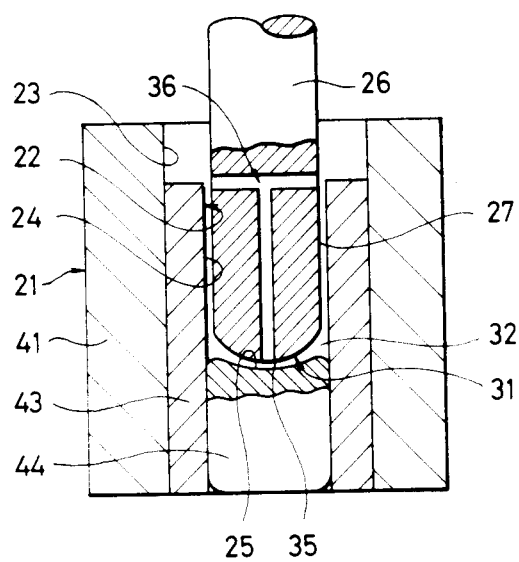
Figure 7:
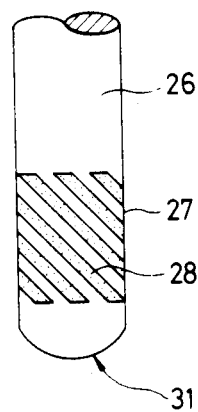
FIG. 7 is a front view of the shaft shown in FIG. 6.

In the embodiment shown in FIGS. 6 and 7, a housing 21 comprises an outer cylinder 41, a sleeve 43 fixedly press-fitted within the inner peripheral surface of the outer cylinder 41, and a cylindrical roller 44 fixedly fitted in the bottom of the inner peripheral surface of the sleeve 43. The inner peripheral surface of the sleeve 43 provides an internal bearing surface 24, and the cylindrical roller 44 provides a concave spherical first bearing surface 25. A second bearing surface 31 formed on a shaft 26 is of a convex spherical shape. The bearing surfaces 25 and 31 have their cross sections crowned arcuately and therefore, the actuating torque of the shaft 26 is decreased and the abrasion of the bearing surfaces 25 and 31 is small. Only the bearing surface 31 of the shaft 26 may be crowned or only the bearing surface 25 of the cylindrical roller 44 may be crowned. Instead of the cylindrical roller 44, a ball may be fixedly fitted within the inner peripheral surface of the sleeve 43.

Figure 8:
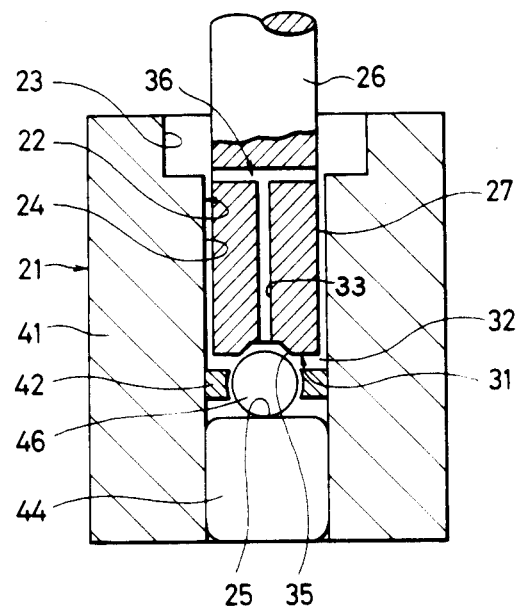
Figure 9:
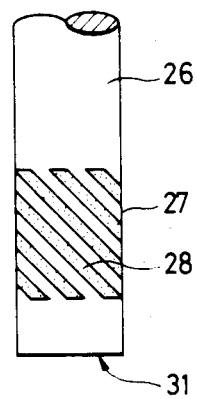
FIG. 9 is a front view of the shaft shown in FIG. 8.

FIGS. 8 and 9 show an embodiment in which a first bearing surface and a second bearing surface are in indirect contact with each other. In this embodiment, a housing 21 comprises an outer cylinder 41 and a cylindrical roller 44 fixedly fitted in the bottom of the inner peripheral surface of the outer cylinder 41. The inner peripheral surface of the outer cylinder 41 provides an internal bearing surface 24, and the planar end surface of the cylindrical roller 44 provides a first bearing surface 25. A second bearing surface 31 of a shaft 26 has its central portion formed into a concave conical shape, and a ball 46 is interposed between the two bearing surfaces 25 and 31 and rotatably held by a retainer 47 The bearing surface 25 and the annular contact portion 35 of the bearing surface 31 are in indirect contact with each other with the ball 46 interposed therebetween when the bearing is stationary.

Thus, during the actuation of a shaft 26, the ball 46 slides relative to the bearing surface 25 and therefore, the actuation torque of the shaft 26 is low. The retainer 47 is provided to prevent the ball 46 from jumping upwardly because when the shaft 26 floats upwards, the pressure of the lubricant in a circulation passage 33 becomes negative to suck the ball 46 upwardly.

The ball 42, the cylindrical roller 44 and the ball 46 in the above-described embodiments may be those which are mass-produced for antifriction bearings, whereby low cost of the bearing device can be realized.

In each embodiment, the dynamic pressure generating groove 28 is provided in the outer bearing surface 27, but alternatively, such groove 28 may be provided in both of the outer bearing surface 27 and the internal bearing surface 24 or only in the internal bearing surface 24.

Figure 10:
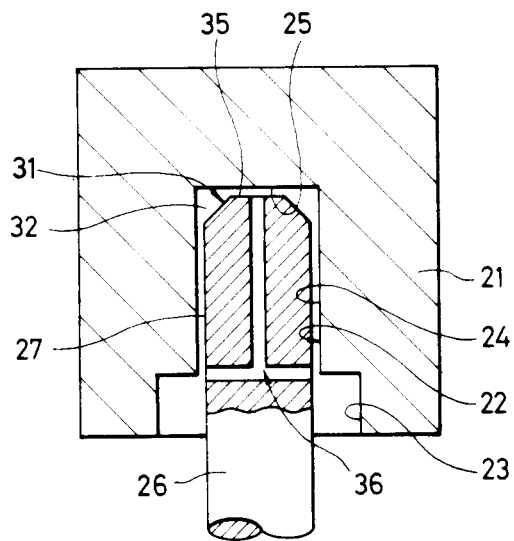
FIG. 10 is a cross-sectional view showing a modification of the embodiment shown in FIGS. 2 and 3.

Also, the entire bearing device can be made into a lateral type by fixing the shaft 26 while making the housing 21 rotatable (inverted) as shown in FIG. 10.

In short, the shaft 26 and the housing 21 need only rotate relative to each other and only one of them may rotate or both of them may rotate either in the same direction or in different directions.

Description will now be made of various embodiments in which improvements have been made to the housing.

Figure 11:
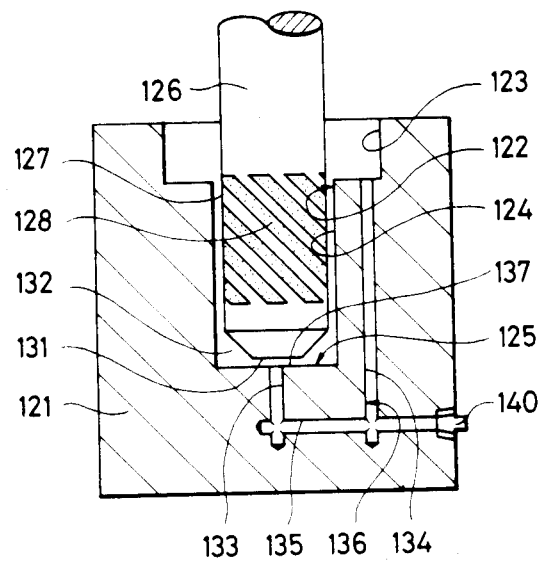
FIG. 11 is a cross-sectional view of the dynamic pressure type fluid bearing device according to still a further embodiment of the present invention.

In the embodiment shown in FIG. 11, a housing 121 comprises a single member and is formed with a cylindrical hole 122. The opening portion of the cylindrical hole 122 provides a large-diametered bore 123 larger in diameter than the cylindrical hole 122, and the inner peripheral surface of the cylindrical hole 122 is provided with a cylindrical internal bearing surface 124 for radial load. The bottom surface of the cylindrical hole 122 is provided with a planar first bearing surface 125 for thrust load, and a shaft 126 is rotatably fitted in the cylindrical hole 122. The outer peripheral surface of the shaft 126 is provided with an outer bearing surface 127 for radial load opposed to and cooperable with the internal bearing surface 124, and the bearing surface 127 is formed with spiral grooves 128 for generating dynamic pressure.

The end of the shaft 126 is provided with a frustoconical second bearing surface 131 for thrust load opposed to and cooperable with the first bearing surface 125, and the two bearing surfaces 125 and 131 together constitute a pressure chamber 132. The housing 121 is provided with an axial circulation passage 133 opening from the central portion of the bearing surface 125, an axial communication passage 134 opening into the large-diametered hole, and a communication passage 135 communicating with the circulation passage 133 and the communication passage 134 and extending perpendicularly to the shaft, the opening of the communication passage 135 being closed by a plug 140. The above-mentioned three 'passages 133, 134 and 135 together constitute a circulation path 136 for lubricant. Thus, the pressure chamber 132 communicates with the outer peripheral surface of the shaft 126 through the circulation path 136. The first bearing surface 125 has around the circulation passage 133 an annular contact portion 137 which contacts the second bearing surface 131 when the bearing is stationary. A lubricant such as oil, grease or air is present in the cylindrical hole 122.

In the dynamic pressure type fluid bearing device of the above-described construction, the contact portion 137 of the first bearing surface 125 and the second bearing surface 131 are in contact with each other when the shaft 126 is stationary, but as the shaft 126 rotates, the lubricant in the large-diametered hole 123 flows into the pressure chamber 132 due to the pumping action of the dynamic pressure generating groove 128 and the shaft 126 floats upwardly due to the pressure increase in the pressure chamber 132. When the shaft 126 floats upwardly, the circulation passage 133, i.e., the circulation path 136, opens to the pressure chamber 132 and the lubricant in the pressure chamber 132 flows out into the large-diametered hole 123 through the circulation path 136.

In this case, the pressure of the lubricant in the pressure chamber 132 is regulated into a substantially constant level by the variation in amount of upward movement of the shaft 126 and there is obtained a predetermined thrust load capacity and the amount of upward movement of the shaft 126 can be minimized. This has become possible by causing the circulation path 136 formed in the housing 121 to open in the bearing surface 125 and bringing it into contact with the bearing surface 131 in the annular contact portion 137.

Figure 12:
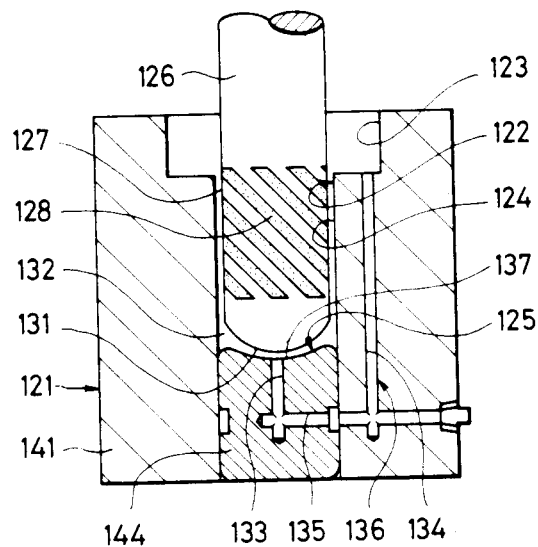
FIGS. 12 to 14 are cross-sectional views of the dynamic pressure type fluid bearing devices according to further embodiments of the present invention.

In the embodiment shown in FIG. 12, a housing 121 comprises an outer cylinder 141 and a cylindrical roller 144 fixedly press-fitted in the bottom of the inner peripheral surface of the outer cylinder 141. The inner peripheral surface of the outer cylinder 141 provides an internal bearing surface 124 and the end surface of the cylindrical roller 144 provides a concave spherical first bearing surface 125. A second bearing surface 131 on the shaft 126 side is formed into a convex spherical shape, and a circulation passage 133 is provided so as to open in the central portion of the bearing surface 125 of the cylindrical roller 144, and a communication passage 135 is provided astride of the cylindrical roller 144 and the outer cylinder 141.

Figure 13:
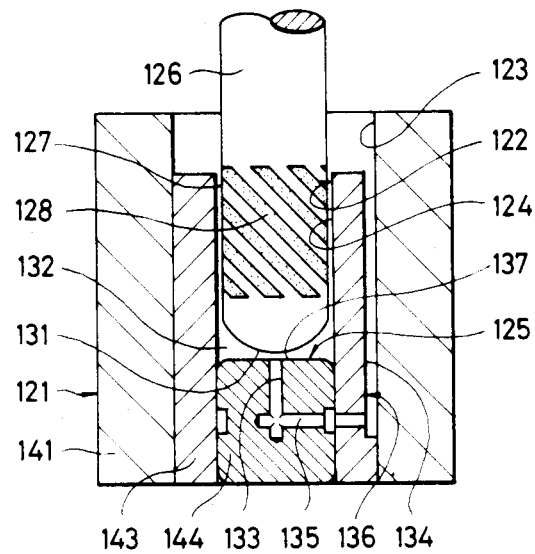

In the embodiment shown in FIG. 13, a housing 121 comprises an outer cylinder 141, a sleeve 143 fixedly press-fitted within the inner peripheral surface of the outer cylinder 141, and a cylindrical roller 144 fixedly fitted in the bottom of the inner peripheral surface of the sleeve 143. The inner peripheral surface of the sleeve 143 provides an internal bearing surface 124, and the end surface of the cylindrical roller 144 provides a planar first bearing surface 125. A communication path 135 is provided in the cylindrical roller 144 and the sleeve 143, and a communication passage 134 is flatly provided in the outer peripheral surface of the sleeve 143.

If the axially communicating passage 134 is thus to be provided between the sleeve 143 and the outer cylinder 141, such passage 134 can be simply provided in the outer peripheral surface of the sleeve 143 by milling, turning and knurling, and this is less costly and suited for mass production.

Figure 14:
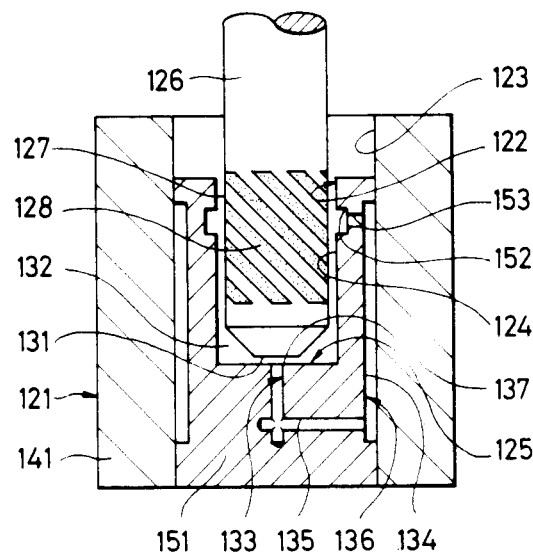

In the embodiment shown in FIG. 14, a housing 121 comprises an outer cylinder 141 and a cylindrical member 151 fixedly fitted within the inner peripheral surface of the outer cylinder 141 and having a cylindrical hole 122, and an internal bearing surface 124 and a first bearing surface 125 are provided in the cylindrical hole 122. The cylindrical member 151 is provided with a circulation passage 133 and a communication passage 135, and a communication passage 134 of small diameter is provided in the intermediate portion of the outer peripheral surface of the cylindrical member 151. An internal bearing surface 124 is formed with an inner peripheral groove 152 which is in communication with the communication passage 134 through a communication passage 153 provided in the cylindrical member 151.

If the axially communicating passage 134 is thus provided between the cylindrical member 151 and the outer cylinder 141, there will also be obtained an effect similar to what has been described above.

As previously described, the dynamic pressure generating groove 128 may be provided in at least one of the shaft 126 and the housing 121, the entire bearing device may be made into an inverted type or a lateral type, either the shaft 126 or the housing 121 may rotate or both may rotate relative to each other, the bearing surface 125 and/or 131 may be modified into various forms, and a commercially available roller may be utilized as the cylindrical roller 144.

Circulation passages 33 and 133 may be provided in both of the first bearing surface 125 of the shaft 26 and the second bearing surface 131 of the housing 121.

We claim:

1. A hydrodynamic pressure type fluid bearing comprising:

a housing provided with a cylindrical hole having a cylindrically shaped inner peripheral surface and a bottom surface;

a shaft disposed in said cylindrical hole and having cylindrical-shaped outer peripheral surface opposed to and cooperative with said bottom surface to bear thrust load;

means for forming a pressure chamber between the bottom surface of the housing and the end surface of the shaft;

hydrodynamic pressure generating means including a spiral groove formed in the outer peripheral surface of the shaft for generating a flow of pressurized fluid to said pressure chamber to form a hydrodynamic pressure therein for bearing the thrust load of said shaft when relative rotation is occurred between the shaft and the housing;

means for supplying fluid to the hydrodynamic pressure generating means;

passage means including a circulation passage through the shaft for returning the pressurized flow from the pressure chamber to said fluid supply means, the passage means including an entrance opening formed in the end surface of the shaft so that a fluid flow from the pressure chamber to the circulation passage may be restricted; and means for closing the entrance opening from the pressure chamber when the hydrodynamic pressure in the pressure chamber is below a predetermined value including an annular portion of said end surface of the shaft which surrounds said entrance opening and a portion of said bottom surface which contacts with said annular portion of the end surface when the hydrodynamic pressure in said pressure chamber is below the predetermined value.

2. A hydrodynamic pressure type fluid bearing according to claim 1, wherein said entrance opening is formed in the central portion of said end surface.

3. A hydrodynamic pressure type fluid bearing according to claim 2, wherein said end surface is a frustoconical surface, and said bottom surface is a flat surface.

4. A hydrodynamic pressure type fluid bearing according to claim 2, wherein said annular portion of said shaft is a flat surface and said portion of said bottom surface is a part-spherical surface.

5. A hydrodynamic pressure type fluid bearing according to claim 2, wherein said end surface of the shaft is convexed toward said bottom surface.

6. A hydrodynamic bearing pressure type fluid bearing according to claim 5, wherein said bottom surface is concaved toward said convexed surface.

7. A hydrodynamic pressure type fluid bearing comprising:

a housing provided with a cylindrical hole having a cylindrically shaped inner peripheral surface and a bottom surface;

a shaft disposed in said cylindrical hole and having a cylindrically-shaped outer peripheral surface opposed to and cooperative with said inner peripheral surface to bear radial load and an end surface opposed to and cooperative with said bottom surface to bear thrust load;

means for forming a pressure chamber between the bottom surface of the housing and the end surface of the shaft;

hydrodynamic pressure generating means for generating a flow of pressurized fluid to said pressure chamber to form a hydrodynamic pressure therein for bearing the thrust load when relative rotation is occurred between the shaft and the housing, the hydrodynamic pressure generating means being provided between the inner peripheral surface of the housing and the outer peripheral surface of the shaft;

means for supplying fluid to the hydrodynamic pressure generating means;

passage means including a circulation passage through the shaft for returning the pressurized flow from the pressure chamber to said fluid supply means, the passage means including an entrance opening formed in the end surface of the shaft so that a fluid flow from the pressure chamber to the circulation passage may be restricted; and means for closing the entrance opening from the pressure chamber when the hydrodynamic pressure in the pressure chamber is below a predetermined value, said closing means including an annular portion of said end surface of the shaft which surrounds said entrance opening and a portion of said bottom surface which contacts with said annular portion of the end surface when the hydrodynamic pressure in said pressure chamber is below the predetermined value.

* * * * *